No. 821,864. PATENTED MAY 29, 1906.
T. C. DEXTER.
POWER TRANSMITTING MECHANISM.
APPLICATION FILED DEC. 14, 1905.
2 SHEETS—SHEET 1.
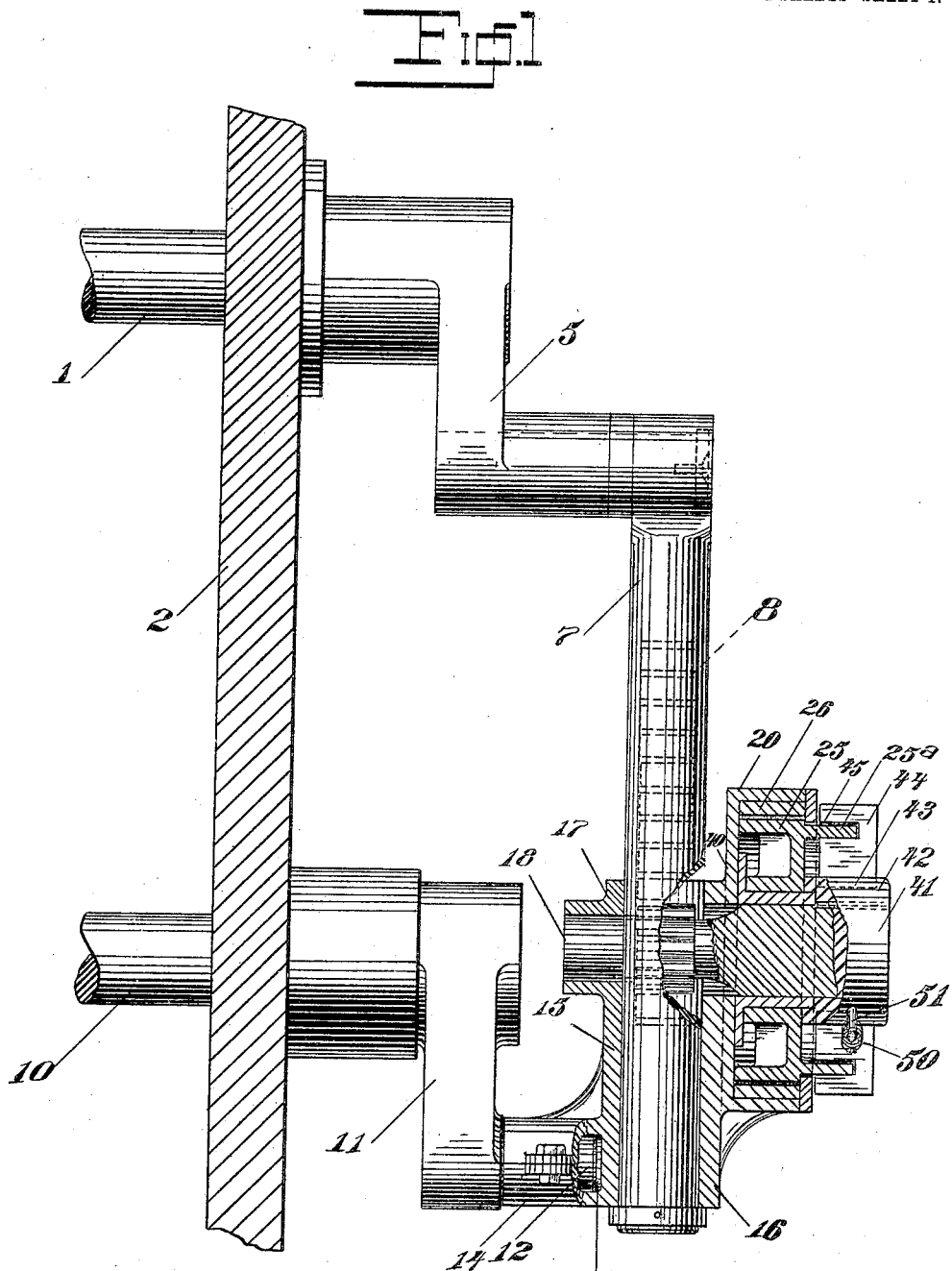
WITNESSES
INVENTOR
Talbot C. Dexter,
BY
Knight Bro.
ATTORNEYS.

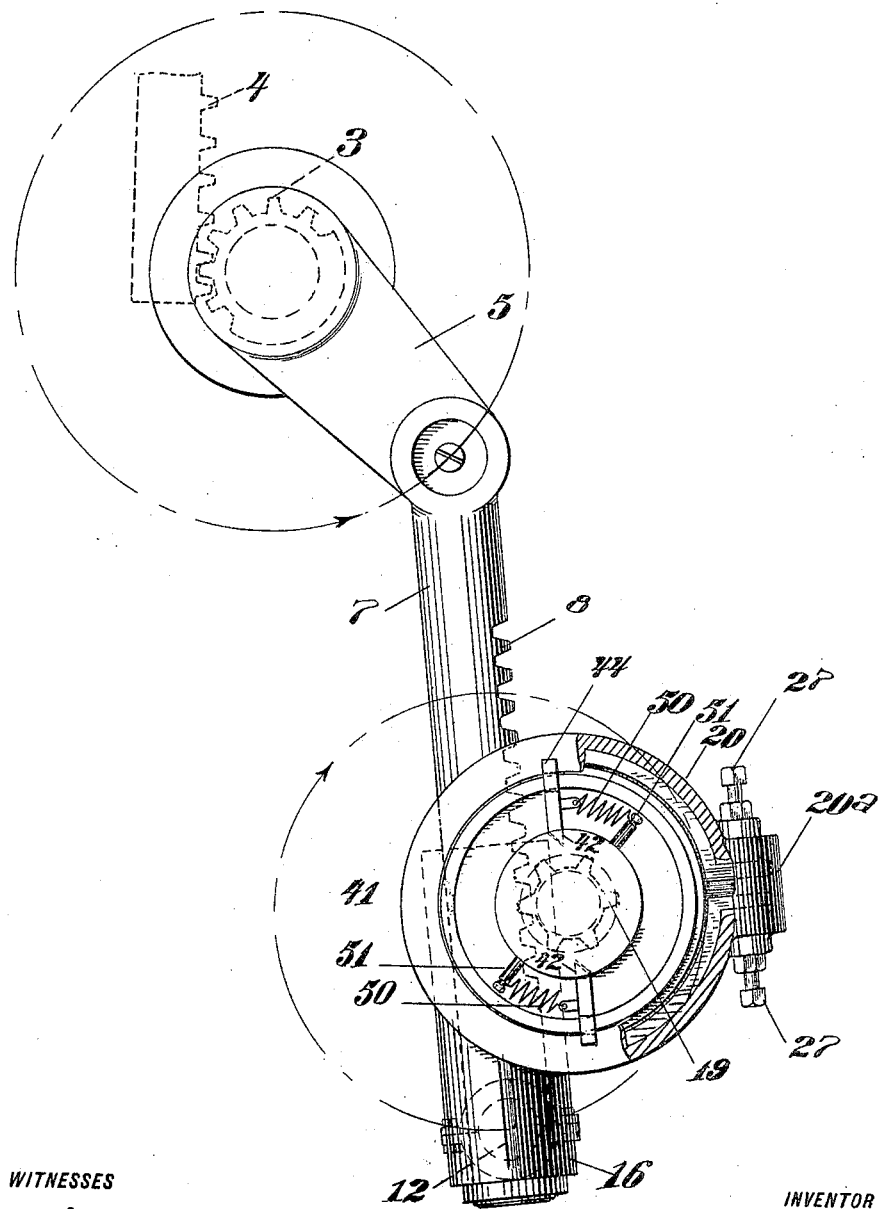

UNITED STATES PATENT OFFICE.

TALBOT C. DEXTER, OF PEARL RIVER, NEW YORK.

POWER-TRANSMITTING MECHANISM.

No. 821,864.　　　　　Specification of Letters Patent.　　　　Patented May 29, 1906.

Application filed December 14, 1905. Serial No. 291,707.

*To all whom it may concern:*

Be it known that I, TALBOT C. DEXTER, a citizen of the United States, residing at Pearl River, county of Rockland, in the State of New York, have invented certain new and useful Improvements in Power-Transmitting Mechanism, of which the following is a specification.

The present invention is an improvement upon the power-transmitting mechanism covered by an application filed by me November 28, 1905, Serial No. 289,508; and the object of the present invention is the same as of the invention of the said application—namely, to produce a simple and effective mechanism for transmitting power of equal force for every stroke of the driven member irrespective of the varying length of stroke of said driven member.

My invention is particularly designed as part of the driving mechanism for the clamp of a paper-cutting machine of the type illustrated and described in my application for patent, Serial No. 246,139, filed February 17, 1905. My invention, however, is of much wider application and will be found useful as a power-transmitting mechanism in any kind of machinery in which the same degree of pressure or thrust is to be imparted every stroke to an oscillating or reciprocating member having variable strokes in its operation.

Like the structure covered by my above-named application, Serial No. 289,508, the rock-shaft which operates the clamp in the paper-cutting machine (or, in fact, the rock-shaft of any mechanism to which my invention may be applied) is provided with a rock-arm to which is pivotally connected a thrust-bar or piston which slides in a socket formed in a reciprocating casing which is engaged by a crank upon a rotating power-shaft. The casing carries a short transverse shaft on which is formed a pinion which meshes with a rack cut in one face of the thrust-bar or piston, a friction slip-clutch being provided for adjustably controlling the rotation of the pinion in the casing.

In addition to the frictional clutch my present invention includes a positive clutch, which locks one member of the frictional clutch to the short transverse shaft when the shaft is moving in one direction and automatically frees said member of the frictional clutch upon the shaft when the shaft is moving in the opposite direction. The purpose of this additional positive clutch is to eliminate the loss of power and unnecessary wear and tear of the parts of the mechanism on the return or inactive stroke of the mechanism of my said application, Serial No. 289,508. To insure the return of the parts to their position of starting, I provide means of engagement between the reciprocating casing and thrust-bar or piston whereby the said thrust-bar or piston and connected rock-shaft are returned to their position of starting at the completion of the return stroke of the reciprocating casing. These means of engagement between the said parts consist, preferably, of a collar or shoulder secured to the lower end of the thrust-bar or piston with which the lower end of the reciprocating casing engages in its return movement.

The power of the rotating crank is transmitted to the thrust-bar through the casing, the pinion engaging the rack tending to prevent movement of the casing upon the thrust-bar until the resistance is sufficient to overcome the frictional hold of the slip-clutch, at which point the pinion will be rotated in the casing to allow the casing to move upon the thrust-bar to the limit of the stroke of the crank, the positive clutch holding one member of the slip-clutch upon the shaft which carries the pinion during the rotation of the shaft in the direction induced by the application of the power. During the second half of the revolution of the power-crank (after the proper application of the power to the rock-shaft) the reciprocating casing tends to move in a reverse direction upon the thrust-bar or piston, which naturally tends to reverse the direction of rotation of the short shaft in the casing, which reversed rotation automatically disengages the positive clutch from the frictional clutch member, so as to allow the free movement of the parts without relative movement of the frictional clutch members, the pinion and its supporting-shaft rotating as the casing moves upon the thrust-bar or piston. This free movement of the parts continues until the latter portion of the return stroke, when the end of the casing engages the collar on the thrust-bar or piston and positively moves it and the connected rock-shaft to their position of starting.

In order that my invention may be fully understood, I will first describe the same with reference to the accompanying drawings and afterward point out the novelty more particularly in the annexed claims.

In said drawings, Figure 1 is a sectional elevation of my improved power-transmitting mechanism. Fig. 2 is a side view of the same, part being broken away.

I have illustrated my improved mechanism in the form in which I have applied it to the paper-cutting machine, in which 1 is a rock-shaft extending transversely of and journaled in the side frames 2 of the cutting machine, said shaft 1 carrying adjacent to its opposite ends pinions, such as 3, which mesh with rack-bars, such as 4, illustrated in Fig. 2. The rack-bars are attached to the straps, which extend from the clamping-bar of the cutter in the usual manner, so that by the rocking of shaft 1 the clamp of the cutter is moved downwardly into engagement with a pile of sheets for holding the pile during the cutting operation and is raised away from the pile at the completion of the cutting operation. The rock-shaft 1 carries at its outer end a cranked rock-arm 5, to the cranked end of which is pivotally connected the upper end of a thrust-bar or piston 7 of cylindrical cross-section and formed on one face with the rack-teeth 8 for the purpose presently to be explained.

10 is a rotary shaft extending transversely of the cutting-machine and also journaled in the side frames 2. This shaft 10 is designed to have power applied to it through any suitable mechanism—such, for instance, as illustrated in my above-named application, Serial No. 246,139. The shaft 10 carries a power-crank 11, whose crank-pin 12 is freely journaled in a socket 13, formed in the stud 14 of the reciprocating casing 15. The casing 15 has a vertical cylindrical barrel 16, through the bore of which the thrust-bar or piston 7 projects. The thrust-bar or piston 7 and casing 15 slide one upon the other in the operation of the mechanism, as hereinafter explained. The casing 15 is also formed with a transverse barrel 17, in which is journaled a short transverse shaft 18. The opening through the barrel 17 (which is at right angles to the barrel 16) cuts tangentially the opening through the barrel 16, and the rack-teeth 8 of the thrust-bar or piston 7 are presented toward the opening which communicates between the bores of the barrels 16 and 17 in position to engage a spur gear or pinion 19, formed on or secured to the short transverse shaft 18, so that relative movement between the casing and thrust-bar or piston will cause the rotation of said shaft 18. The barrel 17 expands into a cylindrical clutch-casing 20, in which is mounted a frictional clutch of any suitable construction, but preferably of the form described in my application Serial No. 276,286, filed August 29, 1905.

25 is the friction-wheel member of the frictional slip-clutch, said member 25 being freely journaled upon a collar or bushing 40, which is itself freely journaled upon the short shaft 18 within the cylindrical casing 20.

Supported between the periphery of the friction-wheel 25 and the casing 20 is an expansible split steel band 26, whose adjacent ends are formed with outwardly-projecting flanges which rest within the radial recess of the projection 20$^a$ of casing 20 in position to be engaged by the adjusting screws or bolts 27, by which the frictional hold of the slip-clutch is controlled. A strip or web of leather or other suitable frictional material is inclosed between the split band 26 and the frictional wheel 25, as shown at 30, the same being riveted to band 26.

Rigidly keyed or otherwise secured to the outer end of the short shaft 18 is a ring or collar 41, which abuts the bushing 40 and friction-wheel member 25 to hold them in proper position upon the shaft. This ring or collar 41 is formed with two diametrically opposite grooves 42, into which project the beveled fulcrum ends 43 of the positive clutch-dogs 44. Each of these clutch-dogs 44 is formed with a transverse slot or recess 45 to receive the annular rim or flange 25$^a$, which projects outwardly from the friction-wheel member 25 of the friction slip-clutch. A short spring 50 connects one face of each clutch-dog 44 with a pin or lug 51, projecting radially from the ring or bushing 41, to cause the clutch-dogs to free themselves from the clutch-rim 25$^a$ when they move in one direction and to bind upon the rim to move in the reverse direction. This form of positive clutch just described is recognized as a very old construction in the art and is not, therefore, specifically claimed by me in the present application, excepting in a broad sense as a positive clutch for locking one member of the frictional clutch to the shaft in one direction of rotation and freeing said member of the frictional clutch upon the shaft when rotating in the opposite direction.

It will be understood that the outer end of the clutch mechanism upon casing 15 should be inclosed by a suitable box-shaped cover, which is not, however, shown in the accompanying drawings. A tappet collar or sleeve 55 is secured to the lower end of the thrust-bar or piston 7, positioned to be engaged by the reciprocating casing 15 on the return stroke of the mechanism, as hereinafter explained.

In the operation of the improved power-transmitting mechanism in its application to a paper-cutting machine, as shown in the accompanying drawings, it will be observed that the rotation of crank 11 will tend to move the casing 15 upwardly upon the thrust-bar or piston 7. This movement of the casing 15 upon the bar 7 can take place only when the shaft 18 and pinion 19 are allowed to rotate in the casing. In the active stroke of the mechanism the rotation of shaft 18 and pinion 19 in the casing is resisted up to a certain amount of pressure by reason of the positive clutch-dogs 44 locking the friction-wheel member 25 upon the shaft and the friction-clutch 25 26 locking the casing to the member 25 of the friction-clutch. So long as the driven rock-shaft 1 moves with sufficient freedom the casing 15 and thrust-bar of the piston 7 will move upwardly together; but as soon as the resistance to the shaft 1 (in this case caused by the clamp engaging the pile of paper in the cutting-machine) is sufficient to overcome the frictional hold of the frictional slip-clutch 25 26 the said friction-clutch members will yield relatively and allow the shaft 18, pinion 19, and frictional-clutch member 25 to rotate in the casing, which in turn will permit the movement of the casing 15 upon the thrust-bar or piston 7 until the limit of the upward stroke of the crank 11 is reached. In a paper-cutting machine the portion of the active stroke of the mechanism through which the casing is moving upon the thrust-bar or piston is the time when the paper-cutting knife is operated. When the crank 11 passes its highest point and starts the return half of its revolution, the casing 12 will tend to move downwardly upon the thrust-bar or piston 7, which will tend to rotate shaft 18 and pinion 19 in a reverse direction, which reverse rotation is freely permitted by reason of the automatic disengagement of clutch-dogs 44, so that in the first part of the return movement of the mechanism casing 15 will slide downwardly upon thrust-bar or piston 7 and shaft 18, pinion 19, and clutch-dogs 44 will rotate freely in the casing, the two members of the frictional slip-clutch being held against rotation in the casing. Near the end of the return stroke the lower end of the casing 15 will engage the collar 55 upon the thrust-bar or piston 7 and positively pull the thrust-bar or piston 7 and connected crank 5 downwardly to return said parts to their normal inactive position, and in the case of a paper-cutting machine thereby relieving the pile of paper from the pressure of the clamping-bar. The parts of the mechanism will then be in the position for starting another stroke, which is accomplished in the same manner as above described.

Having thus described my invention, the following is what I claim as new therein and desire to secure by Letters Patent:

1. In a power-transmitting mechanism, the combination of two relatively movable members, one of which is to be driven by the other, rack-teeth on one of said members, a spur gear or pinion journaled upon the other of said members and meshing with said rack-teeth, and two clutches interposed between said spur gear or pinion and the member on which it is journaled for controlling the rotation of the spur gear or pinion.

2. In a power-transmitting mechanism, the combination of two relatively movable members, one of which is to be driven by the other, rack-teeth on one of said members, a spur gear or pinion journaled upon the other of said members and meshing with said rack-teeth, a friction-clutch interposed between said spur gear or pinion and the member upon which it is journaled for controlling the rotation of the spur gear or pinion, and a second clutch interposed between said spur gear or pinion and one member of said friction-clutch.

3. In a power-transmitting mechanism, the combination of two relatively movable members, one of which is to be driven by the other, a shaft journaled in one of said members, gearing between said shaft and the other member, a frictional clutch supported upon the member in which said shaft is journaled, and a second clutch interposed between one member of the friction-clutch and said shaft and adapted to prevent relative rotation of the shaft and friction-clutch in one direction and allow relative rotation between said parts in the opposite direction.

4. In a power-transmitting mechanism, the combination of two cranks, one of which is to be driven by the other, two relatively movable members sliding one upon the other, one of which is connected to each of said cranks, rack-teeth on one of said members, a shaft journaled upon the other of said members, a spur gear or pinion upon said shaft meshing with said rack-teeth, a friction-clutch supported upon the member in which said shaft is journaled, and a positive clutch interposed between one member of the friction-clutch and said shaft and adapted to prevent relative rotation of the shaft and friction-clutch in one direction and allow relative rotation between said parts in an opposite direction.

5. In a power-transmitting mechanism, the combination of the coöperating telescoping piston and casing, a shaft journaled in the casing, gearing between the shaft and piston, a friction-clutch one member of which is freely journaled upon the shaft, and the other member of which is secured to the casing, a positive clutch adapted to lock the freely-journaled member of the friction-clutch against movement in one direction upon the shaft, and allow it free movement in the reverse direction, and means of engagement between the piston and casing.

6. In a power-transmitting mechanism, the combination of the coöperating telescoping piston and casing, a shaft journaled in the casing, gearing between the shaft and piston, a friction-clutch one member of which is freely journaled upon the shaft, and the other member of which is secured to the casing, a positive clutch adapted to lock the freely-journaled member of the friction-clutch against movement in one direction upon the shaft, and allow it free movement in the reverse direction, and a tappet ring or collar secured to the end of the piston in position to be engaged by the return movement of the casing for restoring the piston to normal position of starting.

7. In a power-transmitting mechanism, the combination of the coöperating telescoping piston and casing, a shaft journaled in the casing, gearing between the shaft and piston, clutch mechanism between said shaft and casing adapted to hold the shaft against free rotation in one direction in the casing and allow free rotation in the reverse direction, and a tappet ring or collar secured to the end of the piston in position to be engaged by the return movement of the casing for restoring the piston to normal position of starting.

TALBOT C. DEXTER.

Witnesses:
A. C. HAMMOND,
GO. A. LEITCH.